Sept. 23, 1969   B. T. HARDESTY ET AL   3,468,052
BUTT EXTENSION FOR A FISHING ROD
Filed Jan. 3, 1967   2 Sheets-Sheet 1

INVENTORS
BENJAMIN T. HARDESTY
THOMAS F. SARAH
BY Hamilton & Cook
ATTORNEYS

Sept. 23, 1969   B. T. HARDESTY ET AL   3,468,052
BUTT EXTENSION FOR A FISHING ROD
Filed Jan. 3, 1967   2 Sheets-Sheet 2
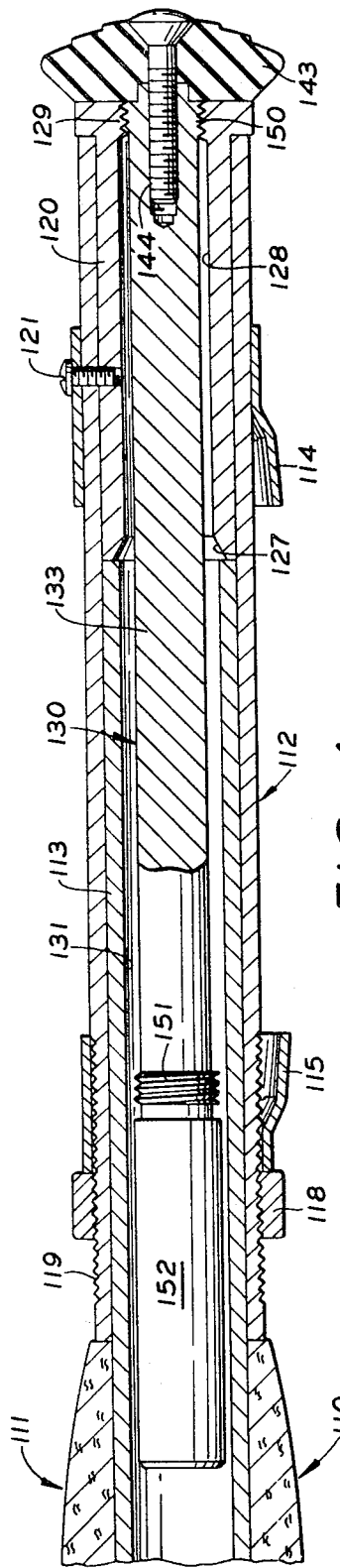
FIG. 4
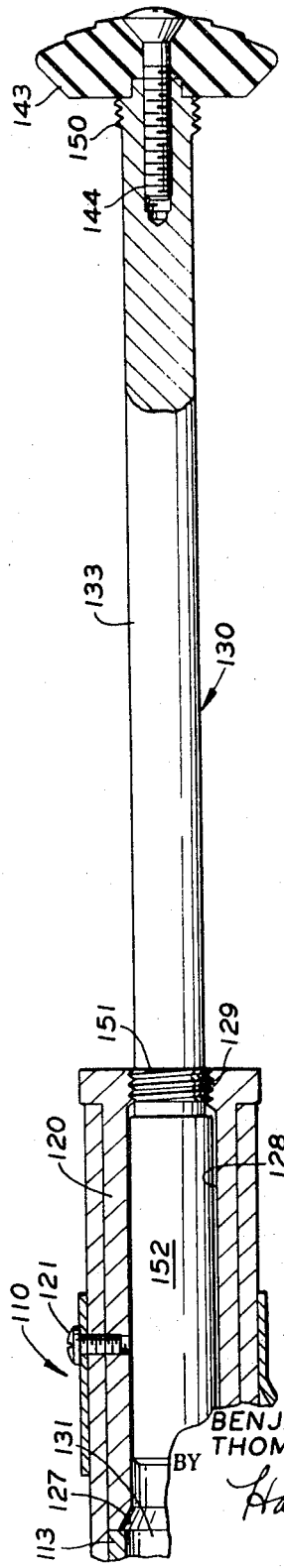
FIG. 5
INVENTORS
BENJAMIN T. HARDESTY
THOMAS F. SARAH
BY
ATTORNEYS

United States Patent Office 3,468,052
Patented Sept. 23, 1969

3,468,052
BUTT EXTENSION FOR A FISHING ROD
Benjamin T. Hardesty and Thomas F. Sarah, Akron, Ohio, assignors to Pflueger Corporation, Akron, Ohio, a corporation of Ohio
Filed Jan. 3, 1967, Ser. No. 606,969
Int. Cl. A01k 87/02
U.S. Cl. 43—23      2 Claims

ABSTRACT OF THE DISCLOSURE

An extender which is slidably received within the handle of a fishing rod. In the forward position the extender is retracted inobtrusively within the handle where it is held by a retaining means. Selectively, the extender may be protracted axially rearwardly of the handle and locked to extend the effective handle length.

BACKGROUND OF THE INVENTION

For many types of fishing the requirement for the length of the fishing rod handle varies from that desired to cast the line and that desired to play the fish. A prime example which epitomizes this non-universality of handle length can be attested by the fly fisherman angling for salmon or steelhead. During the cast the handle should not extend rearwardly of the fisherman's hands much more than is required to mount the reel. A handle which extends excessively rearwardly tends to disturb the balance of the rod in the hand. Moreover, a handle which protrudes too far rearwardly will often collide with the fisherman's arm during the "lift off" and again during the "forward cast," either of which spoils the requisite timing for accurate and/or distance casting.

Casting with spinning and popping rods is also made less efficient when the handle extends too far rearwardly. Yet, to return to our example, once a fish has been hooked it is most advantageous to be able to anchor the rod against the body with the reel sufficiently forward thereof so that it can be operated with ease. Hence, a pronounced rearward extension of the rod butt is often just as desirable after a fish has been hooked as it is undesirable during the cast.

Heretofore, rods have either been constructed to provide a short or long rearward extension, so that the individual fisherman could elect his inconvenience, or, a separate butt extender was provided which the fisherman could put in his pocket during the cast and plug into the butt of the handle when desired.

As any fisherman will appreciate, not every cast is productive. Hence, the fisherman will not plug-in the prior known butt extender until after a fish has been hooked. At such a time three hands are desired, and, in the excitement of the moment, few fishermen can retain the mental clarity required just to remember in which pocket the butt extension is being carried.

SUMMARY OF THE INVENTION

It is therefore an object of the present invention to provide a butt extender for a fishing rod that will be stored where it is always readily available and not subject to being misplaced.

It is another object of the present invention to provide a butt extender, as above, which permits facile extension of the rod handle even during periods of mental anxiety.

It is a further object of the present invention to provide a butt extender, as above, which may be adapted for body contact to anchor the rod or as readily adapted as a sand pike for that type of fishing wherein it is desired to leave the rod self supported.

These and other objects which will become apparent from the following specification are accomplished by means hereinafter described and claimed.

In general, a butt extension constructed according to the concept of the present invention has an extender which is slidable axially of the handle of a fishing rod from a forward, stored position to a rearward, extended position. The extender is maintained in its stored position by a retainer means which is selectively releasable so that the fisherman may easily release the extender and slide it axially rearwardly where it is lockably relieved in the extended position. The lock means by which the extender is held in the extended position is also selectively releasable so that the fisherman may slide it to the stored position when desired.

One preferred and two alternative embodiments are shown by way of example in the accompanying drawings and are described in detail without attempting to show all of the various forms and modifications in which the invention might be embodied; the invention being measured by the appended claims and not by the details of the specification.

DESCRIPTION OF THE DRAWINGS

FIG. 4 is a view similar to FIG. 1 depicting an alternative form of the invention with the butt extension in stored position; and FIG. 5 is a view similar to FIG. 2 depicting the alternative form of FIG. 4 with the butt extension in the extended position.

DESCRIPTION OF SOME PREFERRED EMBODIMENTS

Figure 1:
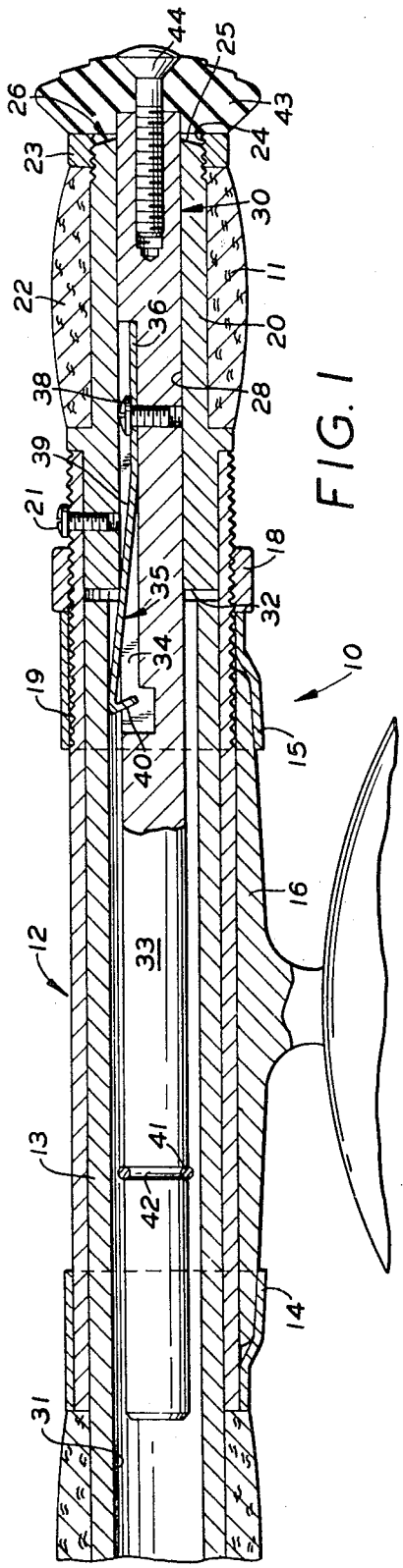
FIG. 1 is a longitudinal cross section through the handle of a fishing rod incorporating a butt extension constructed according to the concept of the present invention and depicted in stored position.
Figure 2:
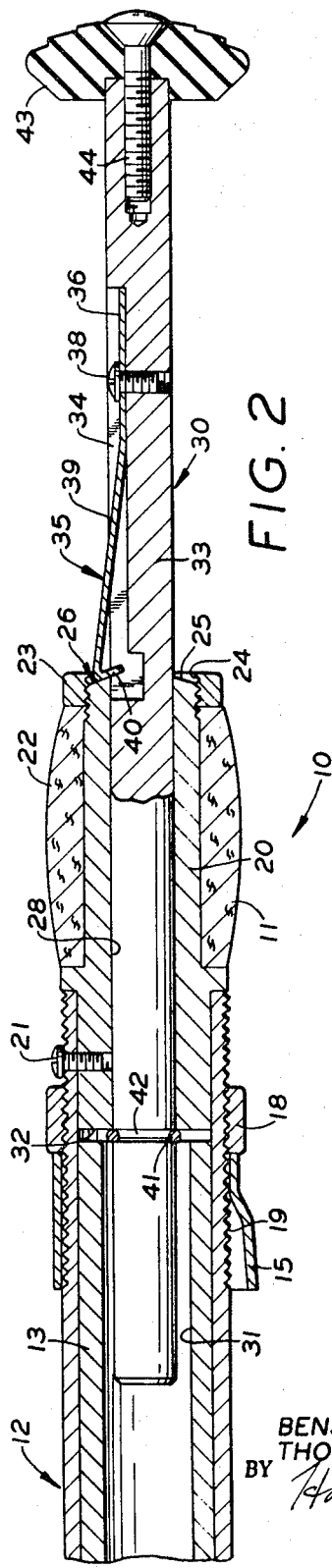
FIG. 2 is a view similar to FIG. 1 depicting the butt extension in the extended position.

Referring more particularly to the drawings, a fishing rod handle embodying the concept of the present invention is identified generally by the numeral 10 in FIGS. 1 and 2. The handle 10 has a gripping portion 11 rearwardly of the reel seating portion 12 as is generally the arrangement for spinning and popping rods. It will become apparent, however, that the location of the gripping and reel seating portions could well be reversed, as it generally is for a fly rod, without impairing the construction or operation of the subject butt extension.

The handle may have a frame which is itself fabricated as the reel seat and on which the gripping portion is fitted, or, as shown, the reel seating portion 12 may be press fitted onto the base portion, or blade, 13 of the rod. The reel seating portion 12 has a fixed hood 14 and a sliding hood 15 adapted to grip the mounting foot 16 of a reel therebetween. A lock nut 18 engages the threads 19 which extend along at least a portion of the length of the seating portion 12 for permitting controlled axial movement of the nut 18 so that a reel can be demountably secured on the seating portion 12.

A guide bushing 20 is fitted in and secured to the reel seating portion 12, as by screw 21. A tubular grip, such as the cork one indicated at 22, may be supported on the radially outer surface of guide bushing 20 and held in place by a retaining nut 23.

The nut 23 preferably extends axially rearwardly of the bushing 20 sufficiently to provide a radial confining shoulder 24 which combines with the rearmost end 25 of bushing 20, to form a first stop shoulder 26.

The guide bushing 20 has an axial bore 28 extending therethrough in which the extender 30 is slidably received. Unless the blade 13 is already hollow, it too has an axial bore 31, at least of sufficient axial extent to permit the extender 30 to be received within the handle 10 in the forward stored position depicted in FIG. 1. With the diameter of the bore 31 being of greater magnitude than the bore 28 a second stop shoulder 32 is formed at the forward end of the bushing 20.

The extender 30 has a cylindrical shaft 33 one side of which is provided with an axial slot 34 in which a spring clip 35 is mounted. Specifically, the base 36 of clip 35 is anchored within the slot 34 by a screw 38, and the arm 39 is a spring which continuously biases the head 40 of the clip 35 redially outwardly. The slot 34 is of adequate extent and cross section so that the clip 35 can be fully retracted therein to allow the shaft 33 of the extender to slide along the bore 28 within which it is closely received.

The stop shoulders 26 and 32 are spaced apart so that the extent of the bore 28 axially therebetween can impart lateral stability to the close fitting shaft 33 of the extender 30, particularly when it is in the extended position depicted in FIG. 2.

In the stored position, the head 40 is biased outwardly against the wall of bore 31 and the arm 39 is biased against the radially inner edge of the stop shoulder 32. This frictional contact of the clip 35 with the interior of the handle maintains the extender 30 in the stored position.

In the extended position the head 40 engages the stop shoulder 26, and a rib, such as the ring 41 received in the annular groove 42 on shaft 33 protrudes radially outwardly therefrom to engage stop shoulder 32 (FIG. 2). As such the extender 30 is locked against further axially rearward movement or axially forward movement.

Figure 3:
FIG. 3 is a partial area of FIG. 1 depicting a variation of the outer tip of the butt extender.

For use against the fisherman's body a resilient butt piece 43 may be secured to the rearmost end of the extender 30, as by screw 44. However, should the type of fishing require a sand pike, the rearward tip of the extender 30' may terminate in a point 45, as shown in FIG. 3.

In either event the extender 30 may be easily translated from the stored position of FIG. 1 to the extended position of FIG. 2. The fisherman merely grasps the extender by the butt piece 43, in the embodiment of FIGS. 1 and 2, or by the point 45, in the variation of FIG. 3, and exerts a rearward pressure to overcome the frictional resistance provided by retainer means—i.e., the frictional contact of the clip 35 against the interior of the handle, as heretofore described. As the rib, or ring, 41 comes against the stop shoulder 32 the head 40 of clip 35 springs outwardly of slot 34 to engage the stop shoulder 26. The extender 30 is thus locked against both forward and rearward movement.

To move the extender 30 from the extended position of FIG. 2 to the stored position of FIG. 1, the angler simply applies thumb pressure to the spring clip 35 so that it is retracted within the slot 34. Thereafter, axially forward pressure on the extender 30 causes it to slide forwardly within the handle to the stored position.

An alternative form of the extender, indicated generally by the numeral 130 in FIGS. 4 and 5, is also easily operated. In that embodiment the handle 110 has the reel seating portion 112 to the rear of the gripping portion 111. Furthermore, the fixed hood 114 is also to the rear of the handle 110 with the sliding hood 115, lock nut 118 and threads 119 spaced forwardly thereof.

The guide bushing 120 is fitted in and secured to the reel seating portion 112, as by screw 121. An axial bore 128 extends through the bushing 120, the forward end of which terminates in a conical guide 127 and the rearward end of which terminates in threaded stop, or anchor, 129.

In this embodiment, too, the interior of the handle forwardly of the bushing 120, or, as in the construction depicted, the blade 113, is provided with an axial bore 131 of greater diameter than the bore 128 through bushing 120.

The extender 130 has a shaft 133 with a first thread engager 150 of relatively short axial extent, at the rearward end thereof and a similar second thread engager 151 at the forward end thereof. The diameter of the bore 128 is of sufficient magnitude that the shaft 133 and the thread engagers 150 and 151 are freely slidable therein, and yet the thread engagers 150 and 151 both matingly interfit the threaded anchor 129.

Forwardly of the second thread engager 151 a stabilizing plug 152 is affixed to the shaft 133. The plug 152 is freely translatable in the larger diameter bore 131, as is the thread engager 151 and shaft 133, but is closely receivable in bore 128 so that, although it may be slidingly translated therein, it will nevertheless impart lateral stability to the extender 130 when it is in the extended position depicted in FIG. 5.

Here too, for use against the fisherman's body a resilient butt piece 143 may be secured to the rearmost end of the extender 130, as by screw 144, although a point may also be substituted therefor should it be desired to provide a sand pike.

To move the extender from the stored position depicted in FIG. 4 to the extended position depicted in FIG. 5, the fisherman rotates the extender 130 by turning the butt piece 143 until the first thread engager 150 is screwed rearwardly out of the threaded stop, or anchor, 129. Thereafter, rearward pressure on the extender 130 translates the second thread engager 151 and the stabilizing plug 152 toward the bore 128. The conical guide 127 eases the engager 151 and plug 152 into the bore and continued rearward pressure brings the thread engager 151 against the threaded stop 129. Rotation of the extender then mates the engager 151 with the stop 129, and the abutment of the plug 152 against stop 129 signals that the extender has been locked in the extended position of FIG. 5.

To move the extender 130 from the extended to the stored position, the fisherman simply counterrotates the extender so that the second engager 151 screws forwardly out of the stop 129 and into the bore 128. Forward pressure on the extender then telescopically translates the extender toward the stored position where it may be retained by screwing the first engager 150 into the stop 129.

I should now be apparent not only that a fishing rod handle may be readily constructed to incorporate an easily extensible and retractable butt extender which can be stored in the handle so that it will always be available but also that the objects of the invention have otherwise been accomplished.

What is claimed is:

1. A butt extension for a fishing rod having a handle portion comprising, an extender, the handle portion having a longitudinal bore, said extender telescopically reciprocal within said bore from a forward, stored position to a rearward, extended position, a radially outwardly biased clip means carried on said extender, rib means extending radially of said extender in axially spaced relation from said clip means, said longitudinal bore presenting spaced, opposed first and second stop shoulders, the engagement of said clip means with said first stop shoulder yieldingly retaining said extender in the forward, stored, position and engagement of said spring clip with said second stop shoulder selectively and lockingly maintaining said extender against forward movement from the rearward, extended position while simultaneous engagement of said rib means with said first stop shoulder prevents further axially rearward movement of said extender when in the rearward, extended position.

2. A butt extension, as set forth in claim 1, in which the radially outwardly biased clip means has a head portion supported from an arm, said arm engageable with said first stop shoulder when the extension is in the forward, stored position and said head portion engageable with said second stop shoulder when the extender is in the rearward, extended position.

References Cited

UNITED STATES PATENTS

| | | | |
|---|---|---|---|
| 930,406 | 8/1909 | McDonald | 43—18 X |
| 942,490 | 12/1909 | Dunn | 43—18 X |
| 1,001,326 | 8/1911 | Upton | 43—23 |
| 1,406,268 | 2/1922 | Madej | 43—18 |
| 2,088,132 | 7/1937 | Domecq | 43—23 |

FOREIGN PATENTS 631,144  9/1927  France.

SAMUEL KOREN, Primary Examiner

D. J. LEACH, Assistant Examiner

U.S. Cl. X.R.

43—18